(12) United States Patent
Higashitani et al.

(10) Patent No.: US 9,321,370 B2
(45) Date of Patent: Apr. 26, 2016

(54) CONTROL METHOD OF ELECTRIC VEHICLE

(71) Applicant: HONDA MOTOR CO., LTD., Minato-ku, Tokyo (JP)

(72) Inventors: Kosuke Higashitani, Tochigi-ken (JP); Masanobu Asakawa, Utsunomiya (JP); Takeshi Taguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/245,849

(22) Filed: Apr. 4, 2014

(65) Prior Publication Data

US 2014/0288746 A1    Sep. 25, 2014

Related U.S. Application Data

(63) Continuation of application No. 13/518,322, filed as application No. PCT/JP2011/074430 on Oct. 24, 2011, now abandoned.

(30) Foreign Application Priority Data

Nov. 10, 2010   (JP) .................................. 2010-252051

(51) Int. Cl.
*B60L 15/20* (2006.01)
*B60L 11/18* (2006.01)

(52) U.S. Cl.
CPC ............. *B60L 15/20* (2013.01); *B60L 11/1803* (2013.01); *B60L 2210/10* (2013.01); *B60L 2240/12* (2013.01); *B60L 2240/16* (2013.01); *B60L 2240/423* (2013.01); *Y02T 10/645* (2013.01); *Y02T 10/7005* (2013.01); *Y02T 10/7216* (2013.01); *Y02T 10/7275* (2013.01)

(58) Field of Classification Search
CPC . B60L 11/1803; B60L 15/20; B60L 15/2045; B60L 2240/12; Y02T 10/642
See application file for complete search history.

(56) References Cited

U.S. PATENT DOCUMENTS

| 5,367,455 | A  | 11/1994 | Kitagawa et al. |
| 5,964,313 | A  | 10/1999 | Guy |
| 6,792,344 | B2 | 9/2004  | Minowa et al. |
| 8,204,639 | B2 | 6/2012  | Jinno et al. |
| 8,781,665 | B2 | 7/2014  | Yamamoto et al. |
| 2002/0079853 | A1 | 6/2002 | Schmitz et al. |

(Continued)

FOREIGN PATENT DOCUMENTS

| CN | 101238006 A | 8/2008 |
| EP | 1 454 787 A2 | 9/2004 |

(Continued)

OTHER PUBLICATIONS

International Search Report, Japanese Patent Application No. PCT/JP2011/074430 dated Nov. 22, 2011.

(Continued)

*Primary Examiner* — Michael J Zanelli
(74) *Attorney, Agent, or Firm* — Squire Patton Boggs (US) LLP (57) ABSTRACT

This electric vehicle is provided with at least a first traveling mode and a second traveling mode for which the maximum velocity (Vmax) is set lower than for the first traveling mode. The second traveling mode is a traveling mode that prioritizes travel distance per one electric power consumption unit.

4 Claims, 9 Drawing Sheets

(56) References Cited

U.S. PATENT DOCUMENTS

| | | |
|---|---|---|
| 2007/0298928 A1 | 12/2007 | Yamanaka et al. |
| 2008/0278302 A1 | 11/2008 | Palmer et al. |
| 2009/0105895 A1 | 4/2009 | Shige |
| 2009/0112383 A1 | 4/2009 | Lenart et al. |
| 2009/0287366 A1 | 11/2009 | Davis et al. |
| 2009/0321165 A1 | 12/2009 | Haug |
| 2010/0010697 A1 | 1/2010 | Soma et al. |
| 2010/0052588 A1 | 3/2010 | Okamura et al. |
| 2010/0082190 A1 | 4/2010 | Jinno et al. |
| 2010/0161195 A1 | 6/2010 | Shin |
| 2010/0305796 A1 | 12/2010 | Aoki et al. |
| 2011/0307130 A1 | 12/2011 | Gow et al. |

FOREIGN PATENT DOCUMENTS

| | | |
|---|---|---|
| JP | 04-299005 A | 10/1992 |
| JP | 5-38003 A | 2/1993 |
| JP | 06-121405 A | 4/1994 |
| JP | 11-205914 A | 7/1999 |
| JP | 11-227493 A | 8/1999 |
| JP | 2001-161003 A | 6/2001 |
| JP | 2006-321466 A | 11/2006 |
| JP | 2007-230431 A | 9/2007 |
| JP | 2007-302055 A | 11/2007 |
| JP | 2008-174019 A | 7/2008 |
| JP | 2008-259270 A | 10/2008 |
| JP | 2009-149116 A | 7/2009 |
| JP | 2011-200056 A | 10/2011 |

OTHER PUBLICATIONS

Chinese Office Action, Chinese Patent Application No. 201180003954.2 issued Jan. 24, 2014.
Extended European Search Report, European Patent Application No. 11839495.6 dated Apr. 28, 2014.
Office Action dated Feb. 11, 2015 issued in co-pending U.S. Appl. No. 14/359,730, filed May 21, 2014.
European Patent Office, European Office Action for corresponding European Patent Application No. 11 839 495.6 dated Jun. 8, 2015.

CONTROL METHOD OF ELECTRIC VEHICLE

CROSS-REFERENCE TO RELATED APPLICATION

This is a Continuation Application of U.S. patent application Ser. No. 13/518,322, filed Jun. 21, 2012, which is a National Phase Entry of International Application No. PCT/JP2011/074430, filed Oct. 24, 2011, which claims priority to Japanese Patent Application No. 2010-252051, filed Nov. 10, 2010. The disclosures of the prior applications are hereby incorporated in their entirety by reference.

TECHNICAL FIELD

The present invention relates to an electric vehicle propelled by an electromotive force generated by an electric motor when the electric motor is supplied with electric power from an electric energy storage device.

BACKGROUND ART

One technology that is concerned with electric vehicles is a technology for controlling a propulsive motor (electric motor). See, for example, U.S. Pat. No. 5,367,455 (hereinafter referred to as "U.S. Pat. No. 5,367,455A") and Japanese Laid-Open Patent Publication No. 06-121405 (hereinafter referred to as "JP06-121405A").

According to U.S. Pat. No. 5,367,455A, the maximum speed of an electric vehicle is limited based on a traveling state and a manipulated state of the vehicle, and a remaining battery power level (see, column 6, line 29 through column 7, line 58, and FIGS. 2 through 10). More specifically, a condition is set as to whether a maximum speed control process, an acceleration control process, or both of such processes should be performed, based on the traveling state and manipulated state of the vehicle (see, column 6, line 64 through column 7, line 7, and FIG. 10). In addition, if the maximum speed control process is performed, then a maximum limit speed ($V_0$) is set depending on the remaining battery power level (DODs) (see, column 6, lines 29 through 34, and FIG. 7(a)). If the remaining battery power level drops to a preset value ($DOD_1$) (S31: YES), and if the driver enters a signal indicating that a traveling performance limit control process should be performed (S34: YES), then the maximum speed control process is performed depending on the settings (S39: YES, and subsequent steps) (see, column 7, line 44 through column 8, line 14).

According to JP06-121405A, an electric vehicle is disclosed, which is capable of selecting a driving performance-oriented power mode and a highly efficient driving-oriented economy mode (see, paragraph [0006]). More specifically, a field current is set depending on the rotational speed of an AC motor in the power mode, and a field current is set depending on the torque command in the economy mode (see, Abstract). For switching between the power mode and the economy mode, a mode switching device (13) may be used (see, paragraph [0007]), or an automatic mode switcher (22) may be used (see, paragraph [0012]). When the mode switching device is used, a low-pass filter (20) prevents a field current command from changing too quickly (see, paragraph [0010]). For switching between traveling modes, the automatic mode switcher weights the economy mode and the power mode depending on a depth to which the accelerator pedal is depressed (see, paragraph [0012]). In addition, a membership function may be used to smoothly switch between traveling modes (see, paragraph [0012]).

A practice also is known in which three or more traveling modes are provided. See, for example, Japanese Laid-Open Patent Publication No. 2007-302055 (hereinafter referred to as "JP2007-302055A").

SUMMARY OF THE INVENTION

According to U.S. Pat. No. 5,367,455A, although the maximum limit speed ($V_0$) (vehicle speed upper limit value) is set to a certain set value, the maximum limit speed is set in relation to a remaining battery power level (DODs), as shown in FIG. 7(a), and plural traveling modes are not taken into account.

The present invention has been made in view of the above problems. It is an object of the present invention to provide an electric vehicle, which is capable of appropriately controlling an electric motor in the presence of a plurality of traveling modes.

According to the present invention, there is provided an electric vehicle propelled by motive power generated by an electric motor when the electric motor is supplied with electric power from an electric energy storage device, comprising selectable traveling modes having different vehicle speed upper limit values for the electric vehicle, the traveling modes including a first traveling mode and a second traveling mode, the second traveling mode having a vehicle speed upper limit value smaller than the first traveling mode. The second traveling mode is a traveling mode in which priority is given to a traveled distance per unit amount of electric power consumption.

If a traveling mode with a greater vehicle speed upper limit value is switched to a traveling mode with a smaller vehicle speed upper limit value, and if an actual vehicle speed exceeds the vehicle speed upper limit value after switching of the traveling mode, a vehicle speed gradual reduction control process may be performed to gradually reduce the vehicle speed to the vehicle speed upper limit value after switching of the traveling mode.

The aforementioned traveling modes, which have different vehicle speed upper limit values for the electric vehicle, may also include a third traveling mode having a vehicle speed upper limit value greater than the first traveling mode and the second traveling mode.

An absolute value of a vehicle speed gradual reduction gradient, which is representative of a reduced degree of the actual vehicle speed in the vehicle speed gradual reduction control process, may be set to a greater value when the third traveling mode is switched to the second traveling mode than when the third traveling mode is switched to the first traveling mode.

A gradual reduction upper limit value, which is representative of the vehicle speed upper limit value used in the vehicle speed gradual reduction control process, may be set from the actual vehicle speed depending on the vehicle speed gradual reduction gradient. The gradual reduction upper limit value may be reduced depending on the actual vehicle speed, if the actual vehicle speed becomes lower than the gradual reduction upper limit value during the vehicle speed gradual reduction control process.

DESCRIPTION OF EMBODIMENTS

1. Description of Overall Configuration

[Overall Configuration]

Figure 1:
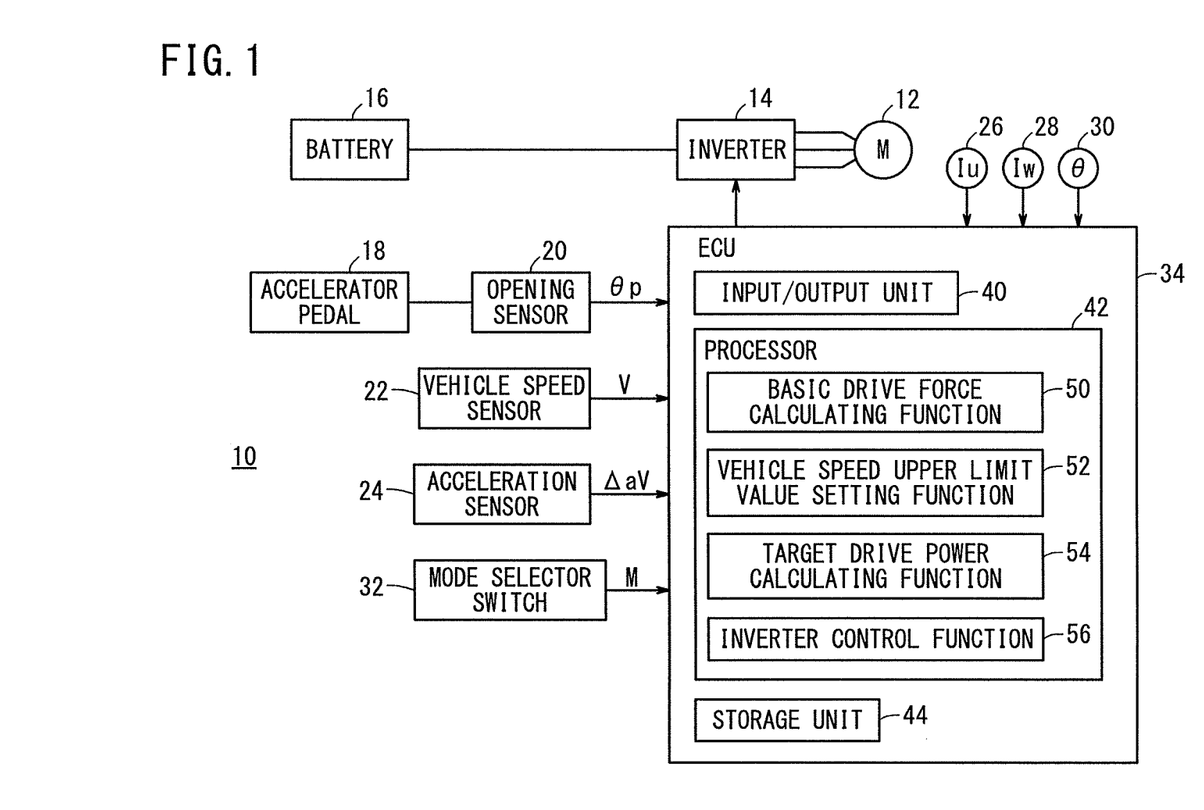
FIG. 1 is a block diagram showing an overall configuration of an electric vehicle according to an embodiment of the present invention.

FIG. 1 is a block diagram showing an overall configuration of an electric vehicle 10 according to an embodiment of the present invention. The electric vehicle 10 (hereinafter also referred to as a "vehicle 10") includes a propulsive motor 12 (hereinafter referred to as a "motor 12"), an inverter 14, a battery 16, an accelerator pedal 18, an opening sensor 20, a vehicle speed sensor 22, an acceleration sensor 24, current sensors 26 and 28, a resolver 30, a mode selector switch 32, and an electronic control unit 34 (hereinafter referred to as an "ECU 34").

[Power System]

The motor 12 is a three-phase AC brushless motor, which generates a drive force F [N] (or a torque [N·m]) for the vehicle 10 based on electric power that is supplied from the battery 16 through the inverter 14. The motor 12 also regenerates electric power (regenerative electric power Preg) [W], which is output to the battery 16 in order to charge the battery 16. The regenerative electric power Preg may also be output to other accessories (not shown).

The inverter 14, which comprises a three-phase bridged structure, performs DC/AC conversion to convert a direct current into a three-phase alternating current, and to supply the three-phase alternating current to the motor 12. The inverter 14 also serves to convert a three-phase alternating current generated in a regenerative mode of the motor 12 into a direct current, and to supply the direct current to the battery 16.

The battery 16 comprises an electric energy storage device including a plurality of battery cells. The battery 16 may be a lithium ion secondary battery, a nickel hydrogen secondary battery, or a capacitor. In the present embodiment, the battery 16 is a lithium ion secondary battery. A DC/DC converter may be connected between the inverter 14 and the battery 16 for stepping up or stepping down the output voltage of the battery 16 or the output voltage of the motor 12.

[Various Sensors]

The opening sensor 20 detects the depth (accelerator opening θp) [°] to which the accelerator pedal 18 is depressed from the original position thereof, and outputs the detected accelerator opening θp to the ECU 34. The vehicle speed sensor 22 detects an actual vehicle speed V [km/h] of the vehicle 10, and outputs the detected vehicle speed V to the ECU 34. The acceleration sensor 24 detects an acceleration ΔaV [km/h] of the vehicle 10, and outputs the detected acceleration ΔaV to the ECU 34.

The current sensor 26 detects a U-phase current (U-phase current Iu) of the motor 12, and outputs the U-phase current Iu to the ECU 34. Similarly, the current sensor 28 detects a W-phase current (W-phase current Iw) of the motor 12, and outputs the W-phase current I2 to the ECU 34. The current sensors 26 and 28 may detect currents in a combination of phases other than a combination of U and W phases, insofar as the current sensors 26 and 28 are capable of detecting currents in two of the three phases of the motor 12. In addition to the current sensors 26 and 28, another current sensor may be added for detecting a V-phase current (V-phase current Iv) of the motor 12, and for outputting the V-phase current Iv to the ECU 34.

The resolver 30 detects an electric angle θ, which is representative of the angular displacement of an output shaft (not shown) of the motor 12, or the angular displacement of a rotor (not shown) of the motor 12, i.e., an angular displacement in a fixed coordinate system of the rotor with respect to a stator (not shown) of the motor 12, and outputs the electric angle θ to the ECU 34.

[Mode Selector Switch 32]

The mode selector switch 32 is capable of switching between traveling modes of the vehicle 10, i.e., a normal mode (hereinafter referred to as an "N mode"), an economy mode (hereinafter referred to as an "E mode"), and a sport mode (hereinafter referred to as an "S mode"). The mode selector switch 32 indicates whatever mode is currently selected to the ECU 34.

The N mode represents a standard traveling mode, in which a vehicle speed upper limit value Vmax1 [km/h] is set as an upper limit value (set value) for the vehicle speed V.

The E mode represents a traveling mode in which higher priority is given to electric power consumption of the vehicle 10 than in the N mode or in the S mode. The E mode also has a lower output response of the vehicle 10 than in the N mode or in the E mode. Electric power consumption is signified by a distance [km/kWh] that the vehicle 10 travels per unit amount of electric power consumption, and may be referred to as an amount of electric power consumption per traveled distance [kWh/km]. In the E mode, a vehicle speed upper limit value Vmax2 [km/h] is set as an upper limit value (set value) for the vehicle speed V. The vehicle speed upper limit value Vmax2 in the E mode is lower than the vehicle speed upper limit value Vmax1 in the N mode or the vehicle speed upper limit value Vmax3 in the S mode (Vmax3>Vmax1>Vmax2). In the E mode, other settings can be changed in comparison with such settings in the N mode and the S mode. For example, as disclosed in JP2007-302055A, settings can be changed concerning the damping force of a variable-damping-force damper, the level of intervention under yaw control based on a distribution of front, rear, left, and right wheel braking forces, the steering reaction force of an electric power steering system, control of a four-wheel-drive mechanism capable of distributing front, rear, left, and right wheel torques, control of transmission, and control of a fuel injection/drive-by-wire (FI/DBW) apparatus (see Table 1 of paragraph [0016] of JP2007-302055A).

The S mode represents a traveling mode in which higher priority is given to the output response of the vehicle 10 than in the N mode or in the E mode. The S mode also has a higher electric power consumption than in the N mode or in the E mode. In the S mode, a vehicle speed upper limit value Vmax3 [km/h] is set as an upper limit value (set value) for the vehicle speed V. The vehicle speed upper limit value Vmax3 in the S mode is set to a value that is higher than the vehicle speed upper limit value Vmax1 in the N mode and the vehicle speed upper limit value Vmax2 in the E mode (Vmax3>Vmax1>Vmax2). The vehicle speed upper limit value Vmax3 may be set such that no numerical value is assigned thereto (no upper limit value). In the S mode, other settings can be changed in comparison with such settings in the N mode and the E mode. For example, settings can be changed as disclosed in JP2007-302055A (see Table 1 in paragraph [0016]).

The vehicle speed upper limit values Vmax1, Vmax2, Vmax3 will hereinafter be referred to collectively as a "vehicle speed upper limit value Vmax".

[ECU 34]

The ECU 34 controls the inverter 14 based on output signals from the various sensors and the mode selector switch 32, so as to control the output force (motive force) of the motor 12. As shown in FIG. 1, the ECU 34 includes an input/output unit 40, a processor 42, and a storage unit 44.

According to the present embodiment, the processor 42 has a basic drive force calculating function 50 for calculating a basic drive force Fb [N] of the motor 12, a vehicle speed upper limit value setting function 52 for setting a vehicle speed upper limit value Vmax, a target drive power calculating function 54 for calculating a target drive force Ftar [N] of the motor 12, and an inverter control function 56 for controlling the inverter 14 based on the target drive force Ftar, or based on a target torque, which is determined on the basis of the target drive force Ftar.

The storage unit 44 serves to store software executed by the processor 42 as well as various data used thereby. The storage unit 44 includes a nonvolatile memory and a volatile memory.

2. Control of the Present Embodiment (1) Calculation of Basic Drive Force Fb

The basic drive force calculating function 50 determines a basic drive force Fb depending on the vehicle speed upper limit value Vmax and the selected traveling mode (hereinafter referred to as a "traveling mode M"). More specifically, the sum of a drive force required to cruise at the vehicle speed upper limit value Vmax (hereinafter referred to as a "cruise drive force Fcru") [N] and a prescribed value A is set as a basic drive force Fb.

For example, when the vehicle 10 is accelerated toward the vehicle speed upper limit value Vmax, the motor 12 is energized using the basic drive force Fb as the target drive force Ftar. When the vehicle speed V approaches the vehicle speed upper limit value Vmax (i.e., when the vehicle speed V exceeds a threshold value lower than the vehicle speed upper limit value Vmax), the target drive force Ftar is gradually reduced. The target drive force Ftar converges to a value, which is produced by subtracting the prescribed value A from the basic drive force Fb (cruise drive force Fcru), so that the vehicle speed V will not exceed the vehicle speed upper limit value Vmax. The prescribed value A is the greatest value in the S mode and the smallest value in the E mode.

(2) Setting Vehicle Speed Upper Limit Value Vmax

Figure 2:
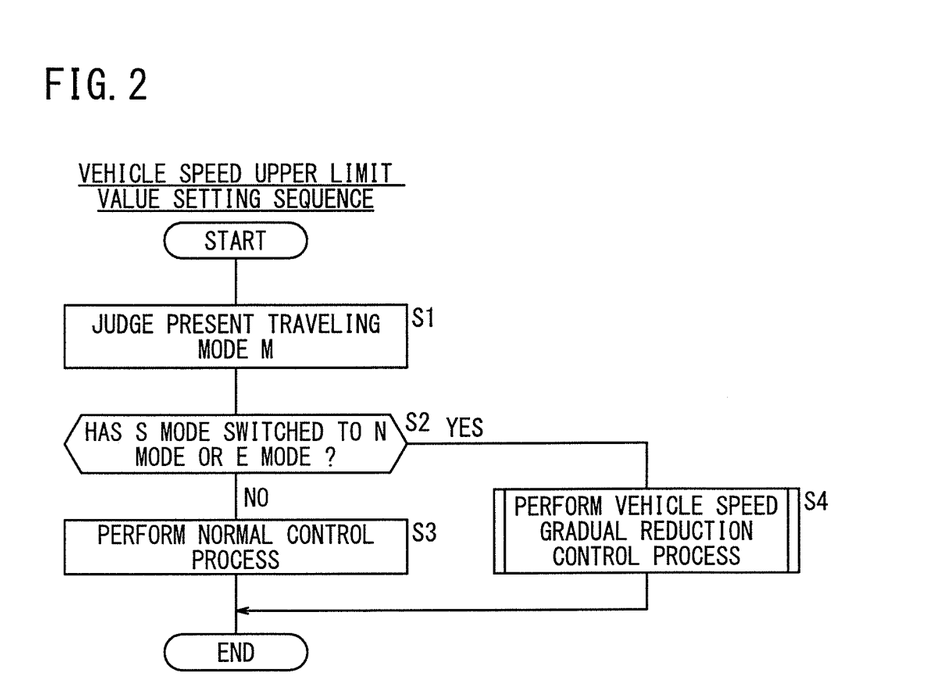
FIG. 2 is a flowchart of a sequence for setting a vehicle speed upper limit value using a vehicle speed upper limit value setting function of a processor in an electronic control unit (ECU)

FIG. 2 is a flowchart of a sequence for setting the vehicle speed upper limit value using the vehicle speed upper limit value setting function 52 of the processor 42 in the ECU 34. In step S1, the ECU 34 judges a traveling mode M based on the output signal from the mode selector switch 32.

In step S2, the ECU 34 judges whether or not the traveling mode M has switched from the S mode to the N mode or the E mode. If the traveling mode M has not switched from the S mode to the N mode or the E mode (S2: NO), then in step S3, the ECU 34 performs a normal control process. The normal control process is a control process for setting a vehicle speed upper limit value Vmax depending on the present traveling mode, while changing the target drive force Ftar in order to equalize the vehicle speed V to the set vehicle speed upper limit value Vmax. Alternatively, as disclosed in JP06-121405A, a field current may be set depending on the rotational speed of the motor 12 in the S mode, and a field current may be set depending on the target torque in the N mode and the E mode.

If the traveling mode M has switched from the S mode to the N mode or the E mode (S2: YES), then the ECU 34 performs a vehicle speed gradual reduction control process, so as to gradually reduce the vehicle speed V to the vehicle speed upper limit value Vmax1 or Vmax2 after switching of the traveling mode M (to the N mode or the E mode).

Figure 3:
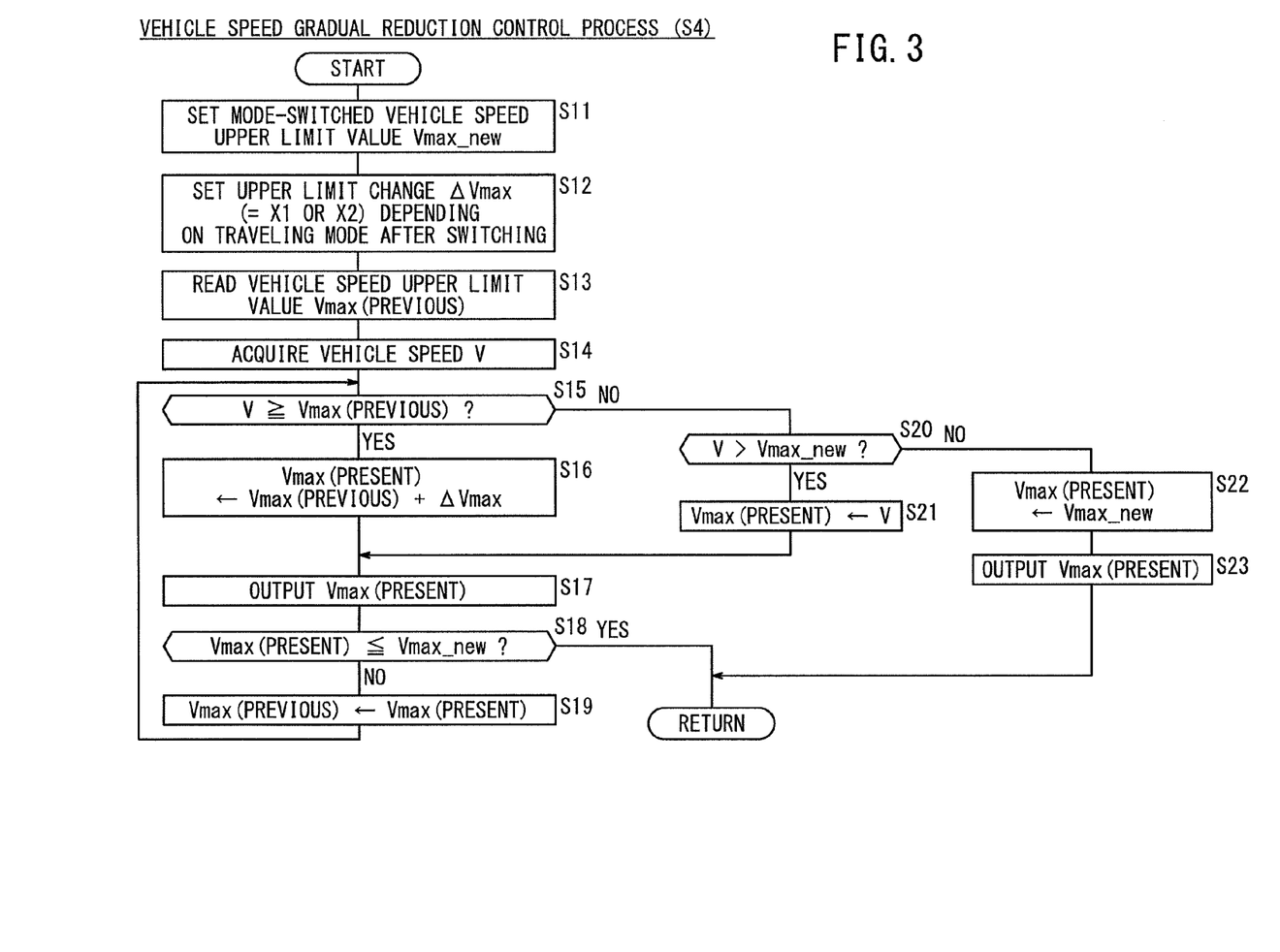
FIG. 3 is a flowchart of a vehicle speed gradual reduction control process.

FIG. 3 is a flowchart of the vehicle speed gradual reduction control process. In step S11, the ECU 34 reads a vehicle speed upper limit value Vmax depending on the traveling mode after switching (hereinafter referred to as a "mode-switched vehicle speed upper limit value Vmax_new") [km/h] from the storage unit 44. However, the ECU 34 does not immediately set the mode-switched vehicle speed upper limit value Vmax_new as a vehicle speed upper limit value Vmax, which is to be determined in a present processing cycle (hereinafter referred to as a "vehicle speed upper limit value Vmax(present)"), but gradually reduces the vehicle speed upper limit value Vmax(present) until finally the vehicle speed upper limit value Vmax(present) becomes the mode-switched vehicle speed upper limit value Vmax_new. Therefore, the present vehicle speed upper limit value Vmax remains the vehicle speed upper limit value Vmax3 depending on the traveling mode (S mode) before switching.

In step S12, the ECU 34 sets an upper limit change Vmax (vehicle speed gradual reduction gradient) depending on the traveling mode after switching. The upper limit change ΔVmax refers to a change in the vehicle speed upper limit value Vmax, which can be reduced in one processing cycle. If the S mode has changed to the N mode, then the upper limit change ΔVmax is a negative value X1. If the S mode has changed to the E mode, then the upper limit change ΔVmax is a negative value X2. The absolute value of the value X2 is greater than the absolute value of the value X1 (|X2|>|X1| and X1>X2). Therefore, the reduced amount in the vehicle speed upper limit value Vmax in one processing cycle is greater when the S mode changes to the E mode than when the S mode changes to the N mode.

In step S13, the ECU 34 reads a vehicle speed upper limit value Vmax in a previous processing cycle (hereinafter referred to as a "vehicle speed upper limit value Vmax(previous)") from the storage unit 44. As described above, at the start of the vehicle speed gradual reduction control process, the vehicle speed upper limit value Vmax(previous) is the vehicle speed upper limit value Vmax3 depending on the traveling mode (S mode) before switching. In step S14, the ECU 34 acquires a vehicle speed V from the vehicle speed sensor 22.

In step S15, the ECU 34 judges whether or not the vehicle speed V acquired in step S14 is equal to or greater than the vehicle speed upper limit value Vmax(previous). If the vehicle speed V is equal to or greater than the vehicle speed upper limit value Vmax(previous) (S15: YES), the ECU 34 repeats steps S16 through S19, so as to gradually reduce the vehicle speed V to the vehicle speed upper limit value Vmax1 or Vmax2 in the traveling mode (N mode or E mode) after switching.

More specifically, in step S16, the ECU 34 sets the sum of the upper limit change ΔVmax (=X1 or X2), which was set in step S12, and the vehicle speed upper limit value Vmax(previous) as a current vehicle speed upper limit value Vmax (present). Since the upper limit change ΔVmax is a negative value, the vehicle speed upper limit value Vmax(present) is smaller than the vehicle speed upper limit value Vmax(previous). The upper limit change ΔVmax may be a positive value, in which case in step S16, the ECU 34 may subtract the upper limit change ΔVmax from the vehicle speed upper limit value Vmax(previous).

In step S17, the ECU 34 outputs the vehicle speed upper limit value Vmax(present), which was set in step S16, to the target drive power calculating function 54.

In step S18, the ECU 34 judges whether or not the vehicle speed upper limit value Vmax(present) is equal to or smaller than the mode-switched vehicle speed upper limit value Vmax_new, which was read in step S11. If the vehicle speed upper limit value Vmax(present) is not equal to or smaller than the mode-switched vehicle speed upper limit value Vmax_new (step S18: NO), then in step S19, the ECU 34 sets the vehicle speed upper limit value Vmax(present) as a new vehicle speed upper limit value Vmax(previous) for a next processing cycle, after which control returns to step S15. Before returning to step S15, the ECU 34 may judge whether or not the traveling mode M has been switched. Control may return to step S15 only if the traveling mode M has not been switched. The present vehicle speed gradual reduction control process may be brought to an end if the traveling mode M has been switched. If the vehicle speed upper limit value Vmax(present) is equal to or smaller than the mode-switched vehicle speed upper limit value Vmax_new (step S18: YES), then control exits from the vehicle speed gradual reduction control process shown in FIG. 3, and returns to the sequence shown in FIG. 2.

If the vehicle speed V is smaller than the vehicle speed upper limit value Vmax(previous) (S15: NO), then in step S20, the ECU 34 judges whether or not the vehicle speed V is greater than the mode-switched vehicle speed upper limit value Vmax_new. If the vehicle speed V is greater than the mode-switched vehicle speed upper limit value Vmax_new (S20: YES), then in step S21, the ECU 34 sets the present vehicle speed V as a vehicle speed upper limit value Vmax (present). It is thus possible to gradually reduce the vehicle speed upper limit value Vmax(present) from a value equal to the present vehicle speed V. After step S21, control returns to step S17.

If the vehicle speed V is equal to or smaller than the mode-switched vehicle speed upper limit value Vmax_new (S20: NO), then at that time, the vehicle speed V can be the to be lower than the vehicle speed upper limit value Vmax in the traveling mode M after switching. In step S22, the ECU 34 sets the mode-switched vehicle speed upper limit value Vmax_new as a vehicle speed upper limit value Vmax(present).

In step S23, the ECU 34 outputs the vehicle speed upper limit value Vmax(present), which was set in step S22, to the target drive power calculating function 54.

(3) Calculation of Target Drive Force Ftar

Figure 4:
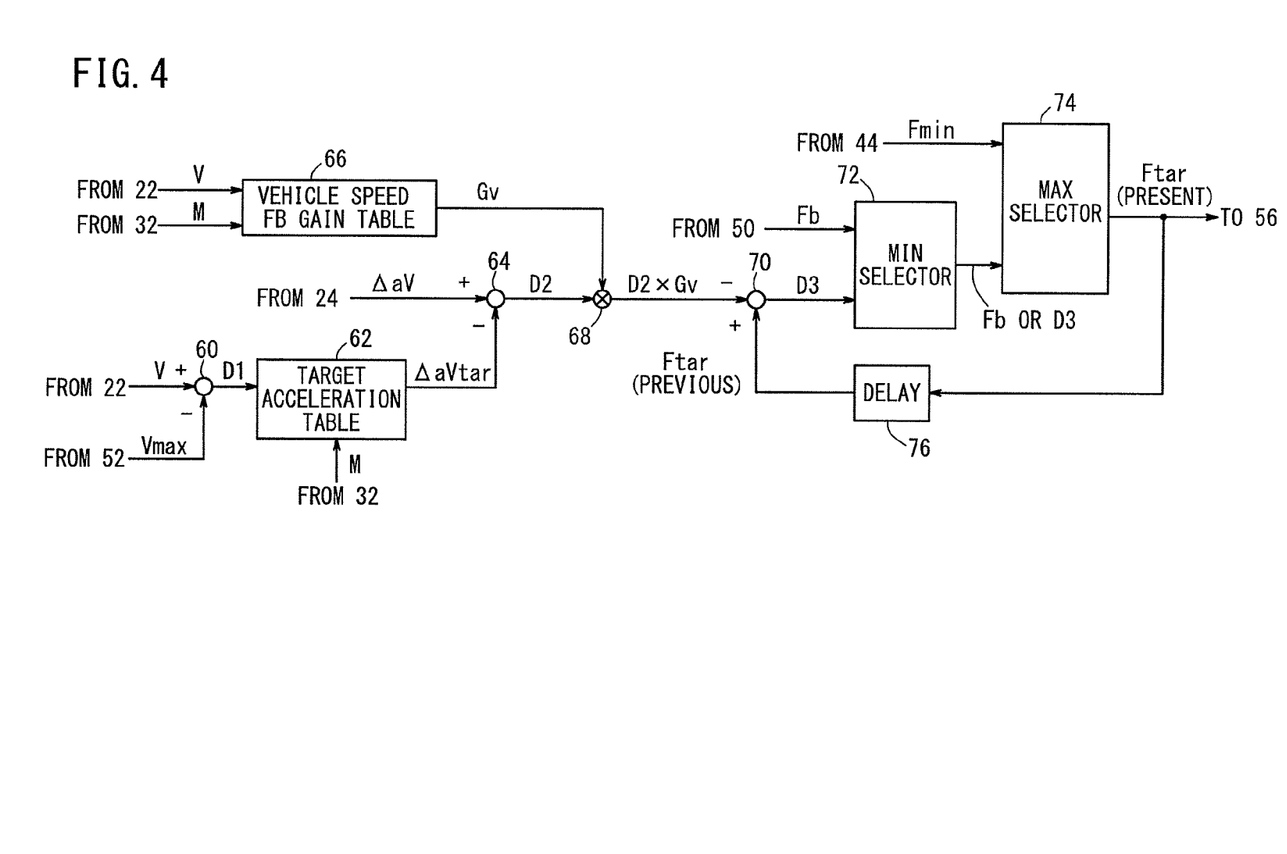
FIG. 4 is a functional block diagram showing a process for calculating a target drive force using a target drive force calculating function of the processor in the ECU.

The target drive power calculating function 54 calculates a target drive force Ftar based on the basic drive force Fb, the vehicle speed V, the vehicle speed upper limit value Vmax, the acceleration ΔaV, the traveling mode M, and a minimum drive force Fmin.

FIG. 4 is a functional block diagram showing a process for calculating the target drive force Ftar using the target drive force calculating function 54 of the processor 42 in the ECU 34.

According to the target drive force calculating function 54, a first subtractor 60 calculates the difference D1 [km/h] between the vehicle speed V from the vehicle speed sensor 22 and the vehicle speed upper limit value Vmax, which was set by the vehicle speed upper limit value setting function 52.

Figure 5:
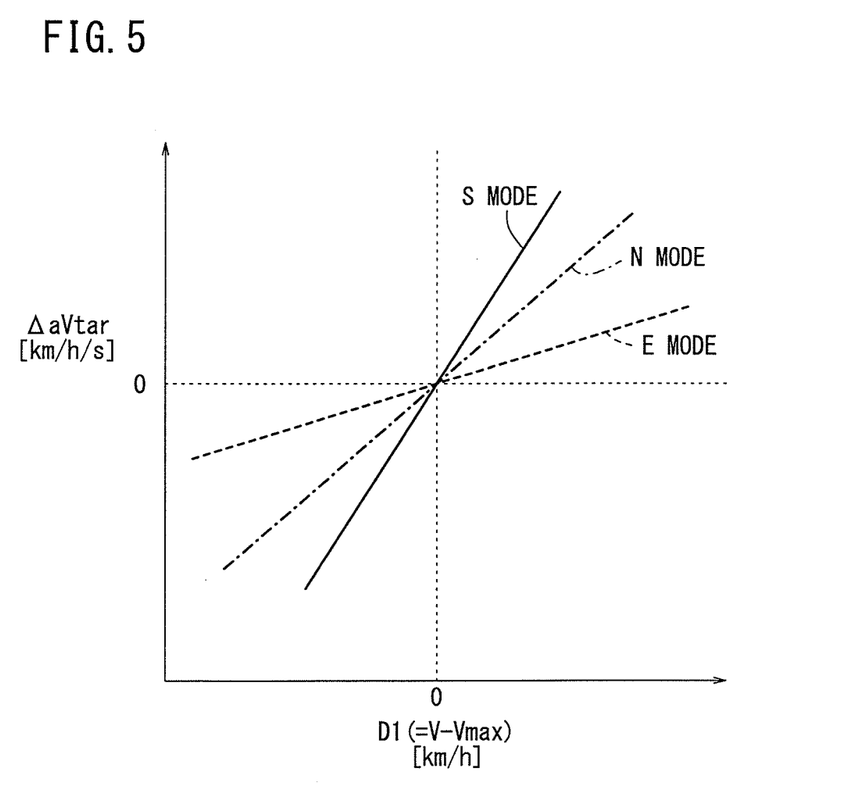
FIG. 5 is a characteristic diagram showing a relationship between the difference between vehicle speed and a vehicle speed upper limit value and a target acceleration for each traveling mode.

Then, a target acceleration table 62 sets a target acceleration ΔaVtar [km/h/s] based on the difference D1 calculated by the first subtractor 60 and the traveling mode M from the mode selector switch 32. FIG. 5 is a characteristic diagram (map) showing the relationship between the difference D1 and the target acceleration ΔaVtar for each traveling mode M. As shown in FIG. 5, when the difference D1 remains the same (except when the difference D1 is zero), the absolute value of the target acceleration ΔaVtar is greater in the N mode than in the E mode, and is greater in the S mode than in the N mode. As the absolute value of the difference D1 becomes greater, the absolute value of the target acceleration ΔaVtar also becomes greater.

A second subtractor 64 calculates the difference D2 [km/h/s] between the acceleration ΔaV from the acceleration sensor 24 and the target acceleration ΔaVtar from the target acceleration table 62.

Figure 6:
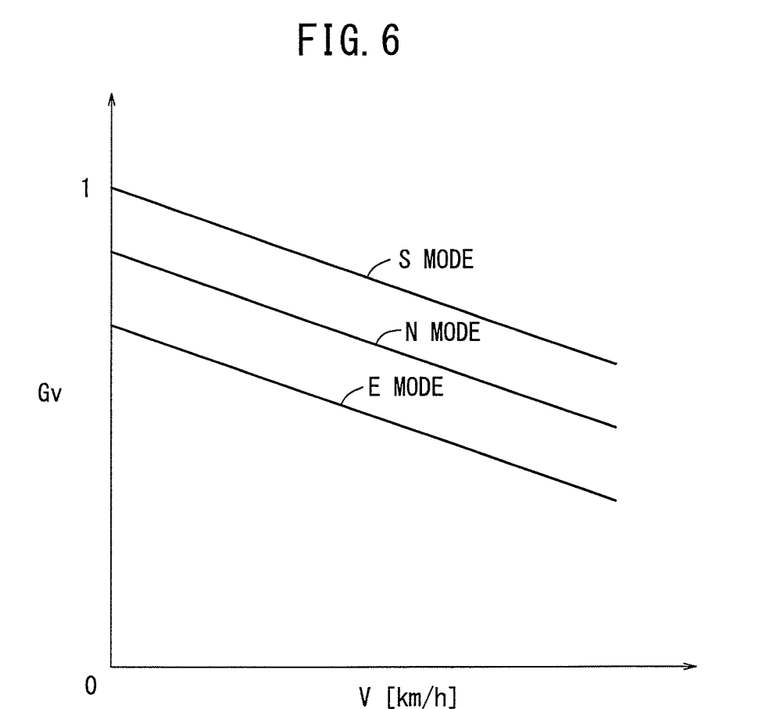
FIG. 6 is a characteristic diagram showing a relationship between vehicle speed and a gain for each traveling mode.

A vehicle speed feedback gain table 66 (hereinafter referred to as a "vehicle speed FB gain table 66") sets a gain Gv based on the vehicle speed V from the vehicle speed sensor 22 and the traveling mode M from the mode selector switch 32. FIG. 6 is a characteristic diagram (map) showing the relationship between vehicle speed V and the gain Gv for each traveling mode M. As shown in FIG. 6, when the vehicle speed V remains the same, the gain Gv is higher in the N mode than in the E mode, and is higher in the S mode than in the N mode. As the vehicle speed V becomes lower, the gain Gv becomes greater.

A multiplexer 68 calculates the product D2×Gv of the difference D2 calculated by the second subtractor 64 and the gain Gv from the vehicle speed FB gain table 66. Then, a third subtractor 70 calculates the difference D3 between the target drive force Ftar from a delay unit 76 (hereinafter referred to as a "target drive force Ftar(previous)") and the product D2×Gv calculated by the multiplexer 68.

A minimum value selector 72 compares the basic drive force Fb determined by the basic drive force calculating function 50 and the difference D3 calculated by the third subtractor 70 with each other, and outputs the smaller of such values to a maximum value selector 74.

The maximum value selector 74 compares a minimum drive force Fmin read from the storage unit 44 with either the basic drive force Fb or the difference D from the minimum value selector 72, and outputs the greater of such values, which represents a target drive force Ftar in the present processing cycle (hereinafter referred to as a "target drive force Ftar(present)"), to the inverter control function 56 and the delay unit 76. The minimum drive force Fmin is set to a value that causes the vehicle 10 to creep.

The delay unit 76 outputs the target drive force Ftar(present), which is determined in the present processing cycle, as a target drive force Ftar(previous) to be used in a next processing cycle to the third subtractor 70.

According to the present embodiment, as described above, the target drive force Ftar is calculated based on the basic drive force Fb, the vehicle speed V, the vehicle speed upper limit value Vmax, the acceleration ΔaV, the traveling mode M, and the minimum drive force Fmin.

More specifically, a basic drive force Fb or a minimum drive force Fmin used in an initial processing cycle is set as a target drive force Ftar(present). Thereafter, when the difference D3 becomes smaller than the basic drive force Fb, the minimum value selector 72 sets the difference D3 as the target drive force Ftar(present). The difference D3 is the difference between the target drive force Ftar(previous) and the product D2×Gv. Consequently, since the difference D3 is gradually reduced by any one of increasing the product D2×Gv (if the product D2×Gv is positive), reducing the product D2×Gv (if the product D2×Gv is negative), and reducing the target drive force Ftar(previous), the target drive force Ftar(present) is reduced.

Stated otherwise, since the minimum value selector 72 outputs the smaller one of the basic drive force Fb and the difference D3, the target drive force Ftar(present) will never exceed the basic drive force Fb.

The difference D2 is the difference between the acceleration ΔaV and the target acceleration ΔaVtar. The gain Gv is set depending on the vehicle speed V and the traveling mode M. Therefore, the product D2×Gv enables the target drive force Ftar(present) to be increased or reduced while making up for any excess or shortage of the acceleration ΔaV with the gain Gv, which depends on the vehicle speed V and the traveling mode M.

For example, when the acceleration ΔaV and the target acceleration ΔaVtar are positive, if the acceleration ΔaV is greater than the target acceleration ΔaVtar (if the vehicle is accelerated excessively), then the difference D2 calculated by the second subtractor 64 is a positive value. Since the gain Gv is a positive value, the difference D3 calculated by the third subtractor 70 becomes smaller. Further, when the acceleration ΔaV and the target acceleration ΔaVtar are negative, if the absolute value of the acceleration ΔaV is smaller than the absolute value of the target acceleration ΔaVtar (if the vehicle is decelerated insufficiently), then the difference D2 calculated by the second subtractor 64 is a positive value. Since the gain Gv is a positive value, the difference D3 calculated by the third subtractor 70 becomes smaller.

As shown in FIG. 6, assuming that the vehicle speed V remains the same, the gain Gv is higher in the N mode than in the E mode, and the gain Gv is higher in the S mode than in the N mode. Accordingly, the output response of the vehicle 10 can be increased in the S mode, whereas electric power consumption can be increased decreased in the E mode.

The target acceleration ΔaVtar is set based on the difference D1 between the vehicle speed V and the vehicle speed upper limit value Vmax. Further, the vehicle speed upper limit value Vmax is gradually reduced by the vehicle speed gradual reduction control process (see FIG. 3). Consequently, it is possible to gradually change the target acceleration ΔaVtar when the S mode is switched to the N mode or the E mode.

According to the vehicle speed gradual reduction control process, the absolute value of the upper limit change ΔVmax (=X2) upon switching from the S mode to the E mode is greater than the absolute value of the upper limit change ΔVmax (=X1) upon switching from the S mode to the N mode. Therefore, when the S mode is switched to the N mode, the time required until the mode-switched vehicle speed upper limit value Vmax_new is reached can be relatively shortened.

(4) Control of Inverter 14

The ECU 34 controls the inverter 14 based on the target torque, which is calculated based on the target drive force Ftar(present) thus determined, the U-phase current Iu from the current sensor 26, the W-phase current Iw from the current sensor 28, and the electric angle θ from the resolver 30. A specific process for controlling the inverter 14 is disclosed in Japanese Laid-Open Patent Publication No. 2009-240125, for example. The target torque can be calculated by multiplying the target drive force Ftar(present) by the radius of the road wheels (not shown).

Figure 7:
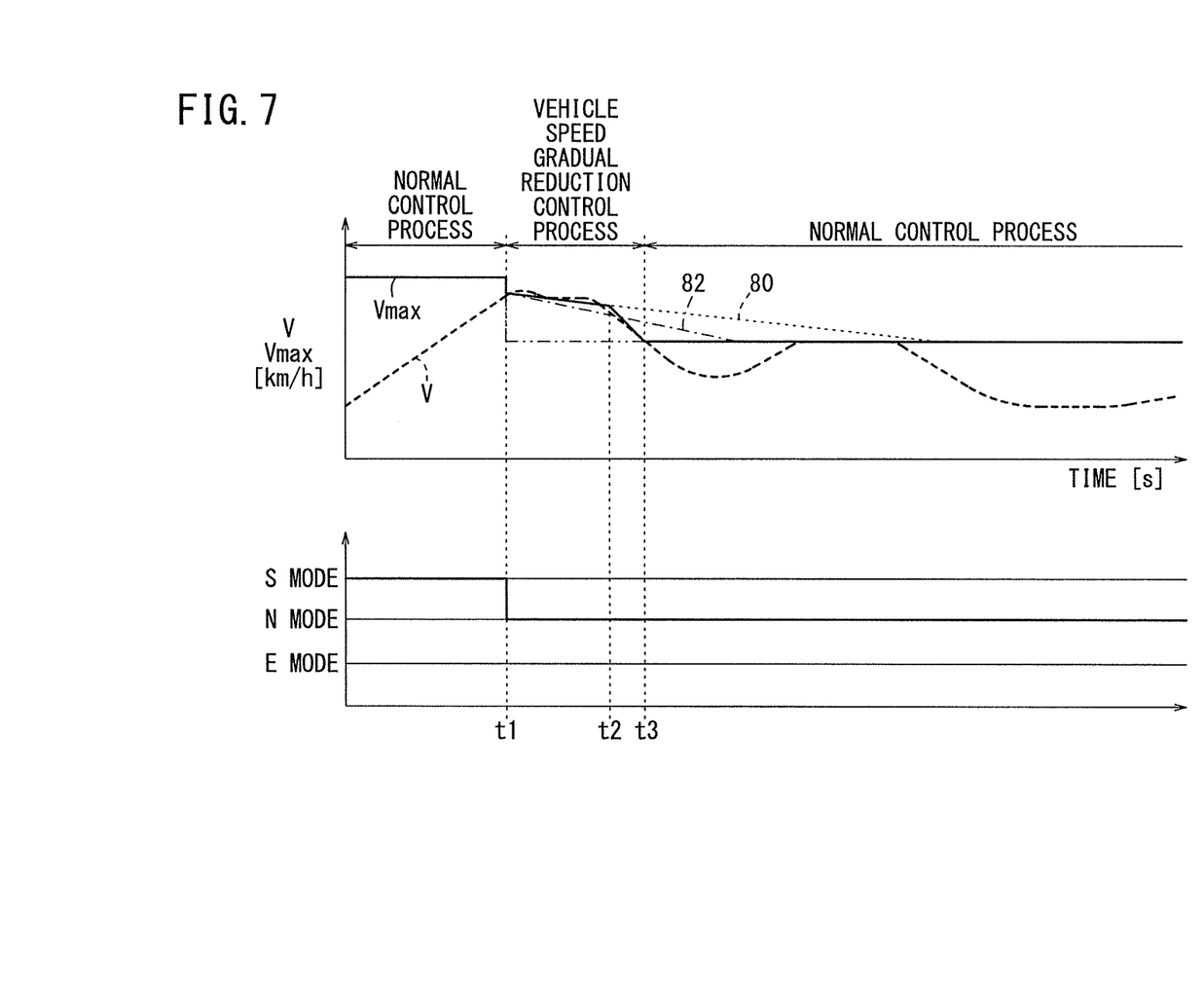
FIG. 7 is a diagram simply showing an example of a relationship between vehicle speed and a vehicle speed upper limit value, when a sport mode (S mode) is switched to a normal mode (N mode)

3. Relationship Between Vehicle Speed Upper Limit Value Vmax and Traveling Mode M (1) when S Mode Switches to N Mode FIG. 7 is a diagram simply showing an example of the relationship between vehicle speed V and the vehicle speed upper limit value Vmax when the S mode is switched to the N mode. In FIG. 7, it is assumed that the S mode is selected up to time t1, and that the N mode is selected after time t1.

Straight lines 80, 82 in FIG. 7 indicate visually the different degrees to which the vehicle speed V and the vehicle speed upper limit value Vmax are reduced when the S mode is switched to the N mode, and when the S mode is switched to the E mode.

More specifically, the straight line 80 is a straight line, the gradient of which is of a negative value X1, extending from the value of the vehicle speed V (=the vehicle speed upper limit value Vmax) at time t1. Stated otherwise, the straight line 80 is a straight line, which is plotted based on the assumption that the vehicle speed V and the vehicle speed upper limit value Vmax are made equal to each other at all times by the vehicle speed gradual reduction control process, after the S mode has been switched to the N mode at time t1. Similarly, the straight line 82 is a straight line, the gradient of which is of a negative value X2, extending from the value of the vehicle speed V (=the vehicle speed upper limit value Vmax) at time t1. Stated otherwise, the straight line 82 is a straight line, which is plotted based on the assumption that the vehicle speed V and the vehicle speed upper limit value Vmax are made equal to each other at all times by the vehicle speed gradual reduction control process, after the S mode has been switched to the E mode at time t1.

If the S mode is switched to the N mode at time t1 (S2: YES in FIG. 2), then the ECU 34 starts the vehicle speed gradual reduction control process (S4). More specifically, at time t1, the vehicle speed V is lower than the vehicle speed upper limit value Vmax (Vmax3) in the traveling mode M (S mode) before switching, and is higher than the mode-switched vehicle speed upper limit value Vmax_new (vehicle speed upper limit value Vmax1) (S15: NO→S20: YES in FIG. 3). Therefore, at time t1, the vehicle speed V is set to the vehicle speed upper limit value Vmax(present) (S21).

From time t1 through time t2, the vehicle speed upper limit value Vmax is gradually reduced (S15: YES→S16→S17→S18: NO→S19 as carried out repeatedly), and the vehicle speed V also is gradually reduced.

From time t2 through time t3, the vehicle speed V is quickly reduced, and the vehicle speed upper limit value Vmax also is reduced (S15: NO→S20: YES→S21→S17→S18: NO→S19 as carried out repeatedly).

At time t3, if the vehicle speed upper limit value Vmax becomes equal to or smaller than the mode-switched vehicle speed upper limit value Vmax_new (vehicle speed upper limit value Vmax1) (S18: YES), then the vehicle speed gradual reduction control process is brought to an end, and control returns to the normal control process (S3 in FIG. 2).

(2) When S Mode Switches to E Mode

Figure 8:
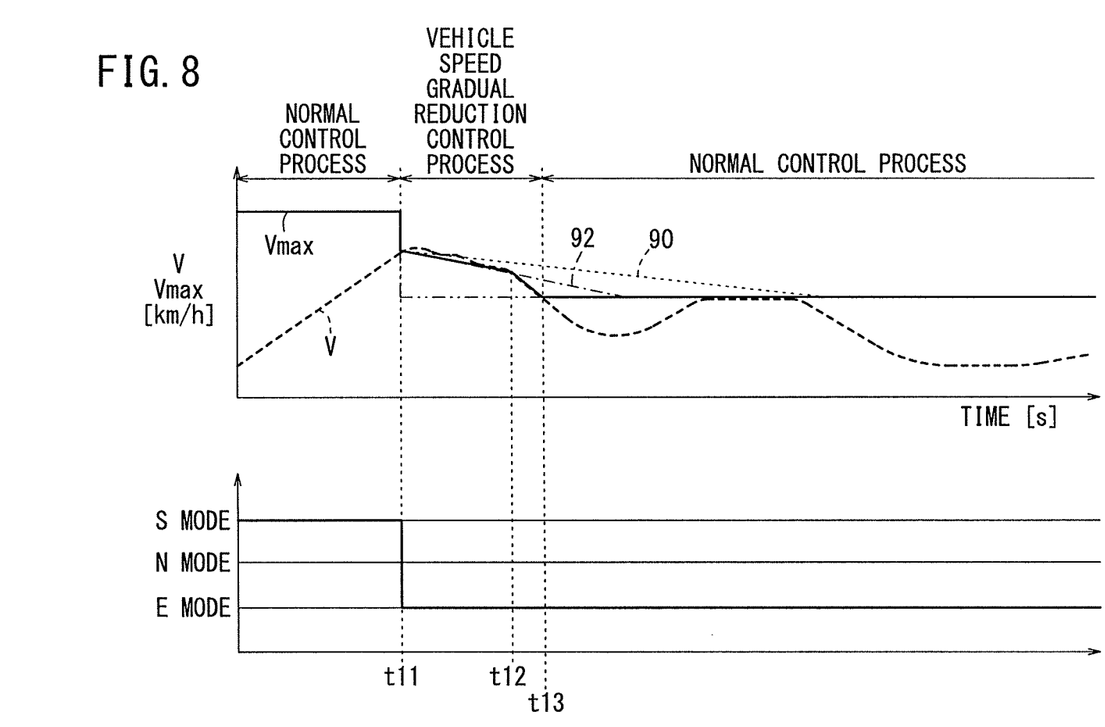
FIG. 8 is a diagram simply showing an example of a relationship between vehicle speed and a vehicle speed upper limit value, when the S mode is switched to an economy mode (E mode)

FIG. 8 is a diagram simply showing an example of the relationship between vehicle speed V and the vehicle speed upper limit value Vmax when the S mode is switched to the E mode. In FIG. 8, it is assumed that the S mode is selected up to time t11, and that the E mode is selected after time t11.

Similar to the straight lines 80, 82 shown in FIG. 7, straight lines 90, 92 in FIG. 8 indicate visually the different degrees to which the vehicle speed V and the vehicle speed upper limit value Vmax are reduced when the S mode is switched to the N mode, and when the S mode is switched to the E mode.

More specifically, the straight line 90 is a straight line, the gradient of which is of a negative value X1, extending from the value of the vehicle speed V (=the vehicle speed upper limit value Vmax) at time t11. Stated otherwise, the straight line 90 is a straight line, which is plotted based on the assumption that the vehicle speed V and the vehicle speed upper limit value Vmax are made equal to each other at all times by the vehicle speed gradual reduction control process, after the S mode has been switched to the N mode at time t11. Similarly, the straight line 92 is a straight line, the gradient of which is of a negative value X2, extending from the value of the vehicle speed V (=the vehicle speed upper limit value Vmax) at time t11. Stated otherwise, the straight line 92 is a straight line, which is plotted based on the assumption that the vehicle speed V and the vehicle speed upper limit value Vmax are made equal to each other at all times by the vehicle speed gradual reduction control process, after the S mode has been switched to the E mode at time t11.

If the S mode is switched to the E mode at time t11 (S2: YES in FIG. 2), then the ECU 34 starts the vehicle speed gradual reduction control process (S4). More specifically, at time t11, the vehicle speed V is lower than the vehicle speed upper limit value Vmax (Vmax3) in the traveling mode M (S mode) before switching, and is higher than the mode-switched vehicle speed upper limit value Vmax_new (vehicle speed upper limit value Vmax2) (S15: NO→S20: YES in FIG. 3). Therefore, at time t11, the vehicle speed V is set to the vehicle speed upper limit value Vmax(present) (S21).

From time t11 through time t12, the vehicle speed upper limit value Vmax is gradually reduced (S15: YES→S16→S17→S18: NO→S19 as carried out repeatedly), and the vehicle speed V also is gradually reduced.

From time t12 through time t13, the vehicle speed V is quickly reduced, and the vehicle speed upper limit value Vmax also is reduced (S15: NO→S20: YES→S21→S17→S18: NO→S19 as carried out repeatedly).

At time t13, if the vehicle speed upper limit value Vmax becomes equal to or smaller than the mode-switched vehicle speed upper limit value Vmax_new (vehicle speed upper limit value Vmax2) (S18: YES), then the vehicle speed gradual reduction control process is brought to an end, and control returns to the normal control process (S3 in FIG. 2).

4. Advantages of the Present Embodiment

According to the present embodiment, as described above, the vehicle 10 has a plurality of traveling modes (N mode, E mode, and S mode) with different vehicle speed upper limit values Vmax, respectively. The vehicle speed upper limit values Vmax are switched depending on a selected one of the traveling modes. Thus, it is possible to set a vehicle speed upper limit value Vmax depending on each traveling mode, and to control the output power of the motor 12 depending on the selected traveling mode. Therefore, the motor 12 can be controlled appropriately. For example, depending on the selected traveling mode, the output power of the motor 12 from can be prevented from being increased or reduced more than necessary.

The vehicle speed upper limit value Vmax is smaller in the E mode than in the N mode or the S mode. Therefore, the E mode functions as a traveling mode in which priority is given to electric power consumption. Generally, after the vehicle speed V, which increases, exceeds a vehicle speed at which electric power consumption is lowest (lowest-electric-power-consumption vehicle speed or economic speed), electric power consumption is increased as the vehicle speed V increases. Therefore, if the vehicle speed upper limit value Vmax in the E mode is set to a value that decreases electric power consumption more so than the vehicle speed upper limit values Vmax in the N mode or the S mode, then it is possible for the vehicle 10 to travel with low electric power consumption in the E mode, even if the vehicle speed V is equal to the vehicle speed upper limit value Vmax.

According to the present embodiment, when a traveling mode having a higher vehicle speed upper limit value Vmax is switched to a traveling mode having a lower vehicle speed upper limit value Vmax (i.e., when the S mode is switched to the N mode or the S mode), if the actual vehicle speed V exceeds the mode-switched vehicle speed upper limit value Vmax, then the vehicle speed gradual reduction control process is carried out in order to gradually reduce the actual vehicle speed V to the mode-switched vehicle speed upper limit value Vmax. In this manner, the vehicle speed V is prevented from changing abruptly upon switching between traveling modes, thereby achieving better riding comfort.

According to the present embodiment, the traveling modes, which have different vehicle speed upper limit values Vmax, include the S mode, which has a vehicle speed upper limit value Vmax higher than the N mode or the E mode. Therefore, the vehicle 10 has three traveling modes, each having a different vehicle speed upper limit value Vmax, respectively, whereby the motor 12 can be controlled more appropriately.

According to the present embodiment, an absolute value of the upper limit change ΔVmax is higher when the S mode is switched to the E mode than when the S mode is switched to the N mode (|X2|>|X1|). Therefore, the time required to reach the mode-switched vehicle speed upper limit value Vmax_new is made shorter when the S mode is switched to the E mode, as opposed to the upper limit change ΔVmax remaining the same upon switching between the traveling modes. Therefore, at the time that the S mode is switched to the E mode, traveling resistance is quickly lowered in order to reduce energy loss, thus making it possible to increase the cruising distance that the electric vehicle E can travel continuously using the stored energy of the battery 16.

Figure 9:
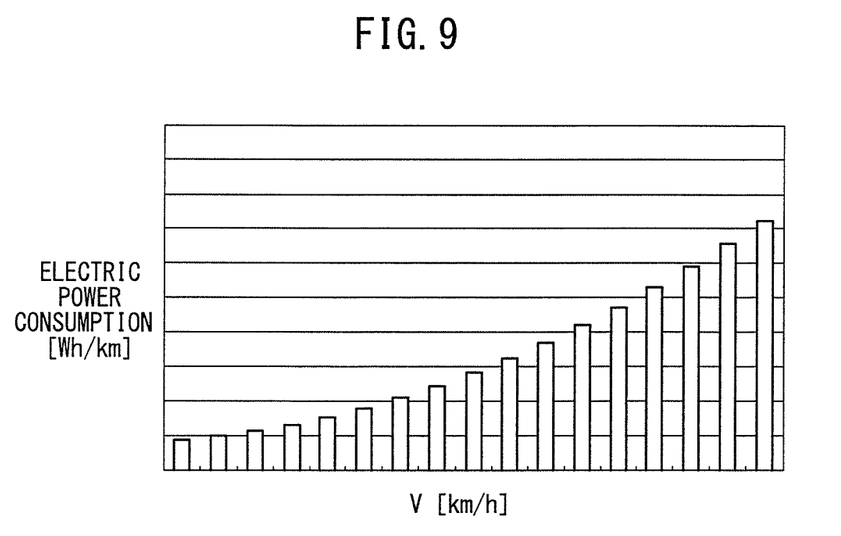
FIG. 9 is a diagram showing an example of a relationship between vehicle speed and the electric power consumption of a vehicle (based on traveling resistance).

More specifically, as shown in FIG. 9, as the vehicle speed V becomes higher, the electric power consumption of the vehicle 10 (based on the traveling resistance) increases. Therefore, when the S mode is switched to the E mode, the vehicle speed V is quickly reduced in order to improve electric power consumption, thereby improving the cruising distance of the vehicle 10.

According to the present embodiment, the vehicle speed upper limit value Vmax, which is used in the vehicle speed gradual reduction control process, is set from the actual vehicle speed V depending on the upper limit change ΔVmax. If, during the vehicle speed gradual reduction control process, the vehicle speed V becomes lower than the vehicle speed upper limit value Vmax, then the vehicle speed upper limit value Vmax is lowered depending on the vehicle speed V (S15: NO→S20: YES→S21 in FIG. 3). The vehicle speed V can thus be made to reach the mode-switched vehicle speed upper limit value Vmax_new more rapidly.

5. Modifications

The present invention is not limited to the above embodiment, but various alternative arrangements may be employed based on the present disclosure of the invention. For example, the present invention may employ the following arrangements.

In the above embodiment, the ECU 34 is incorporated in the vehicle 10. However, the ECU 34 may be incorporated in other mobile bodies (for example, ships or aircraft) having a plurality of traveling modes.

In the above embodiment, only the battery 16 serves as the drive source of the vehicle 10. However, an engine may be mounted in addition to the battery 16 (hybrid vehicle), or a fuel cell may be mounted in addition to the battery 16 (fuel cell vehicle).

In the above embodiment, the vehicle 10 has three traveling modes, including the N mode, the S mode, and the E mode. However, the vehicle 10 may have at least two traveling modes each of which has a different vehicle speed upper limit value Vmax. For example, the vehicle 10 may have only the N mode and the E mode, or the vehicle 10 may have a combination of other modes (at least one of a race mode and a snow mode, as disclosed in JP2007-302055A) in addition to or instead of the N mode, the S mode, and the E mode.

In the above embodiment, the mode selector switch 32 is used to switch between traveling modes. However, another means may be used to switch between traveling modes. For example, an automatic traveling mode switcher may be used, as disclosed in JP06-121405A.

In the above embodiment, the vehicle speed gradual reduction control process is carried out only when the S mode is switched to the N mode, or when the S mode is switched to the E mode. However, the vehicle speed gradual reduction control process may be carried out when the N mode is switched to the E mode. Stated otherwise, the vehicle speed gradual reduction control process may be carried out if the vehicle speed upper limit value Vmax in the traveling mode M after switching is lower than the vehicle speed upper limit value Vmax in the traveling mode M before switching. If the vehicle speed gradual reduction control process is carried out when the N mode is switched to the E mode, then the upper limit change ΔVmax may be the same as the value X2 when the S mode is switched to the E mode.

In the above embodiment, when the S mode is switched to the N mode, the upper limit change ΔVmax is a negative value X1, whereas when the S mode is switched to the E mode, the upper limit change ΔVmax is a negative value X2, so that the vehicle speed upper limit value Vmax and the vehicle speed V change more abruptly when the S mode is switched to the E mode than when the S mode is switched to the N mode. Stated otherwise, the upper limit change ΔVmax acquires different values when the S mode is switched to the N mode and when the S mode is switched to the E mode, thereby enabling the vehicle speed upper limit value Vmax and the vehicle speed V to change more abruptly when the S mode is switched to the E mode.

When the S mode is switched to the E mode, the vehicle speed upper limit value Vmax and the vehicle speed V may be changed abruptly in other ways. For example, instead of the upper limit change ΔVmax being switched to different values, coefficients may be established by which the upper limit change ΔVmax is multiplied. In this case, the coefficient that is used when the S mode is switched to the E mode may be greater than the coefficient that is used when the S mode is switched to the N mode.

Alternatively, the upper limit change ΔVmax may be provided only when the S mode is switched to the E mode. Further, alternatively, instead of using the upper limit change ΔVmax, coefficients may be established by which the target drive force Ftar is multiplied. In this case, the coefficient that is used when the S mode is switched to the E mode may be smaller than the coefficient that is used when the S mode is switched to the N mode.

The invention claimed is:

1. A control method of an electric vehicle propelled by motive power generated by an electric motor when the electric motor is supplied with electric power from an electric energy storage device, comprising:

setting selectable traveling modes having different vehicle speed upper limit values for the electric vehicle, the traveling modes including a first traveling mode and a second traveling mode, the second traveling mode having a vehicle speed upper limit value smaller than the first traveling mode, wherein the second traveling mode is a traveling mode in which priority is given to a traveled distance per unit amount of electric power consumption, wherein, if a traveling mode with a greater vehicle speed upper limit value is switched to a traveling mode with a smaller vehicle speed upper limit value, and if an actual vehicle speed exceeds the vehicle speed upper limit value after switching of the traveling mode, a vehicle speed gradual reduction control process is performed to gradually reduce the vehicle speed to the vehicle speed upper limit value after switching of the traveling mode, wherein the vehicle speed upper limit values of the first and second driving modes are predetermined and fixed values, and wherein in the vehicle speed gradual reduction control process, the vehicle speed upper limit value is gradually reduced from the predetermined and fixed vehicle speed upper limit value of the first driving mode to the predetermined and fixed vehicle speed upper limit value of the second driving mode, wherein a gradual reduction upper limit value, which is representative of the vehicle speed upper limit value used in the vehicle speed gradual reduction control process, is set from the actual vehicle speed depending on a vehicle speed gradual reduction gradient, which is representative of a reduced degree of the actual vehicle speed, and wherein the gradual reduction upper limit value is reduced depending on the actual vehicle speed, if the actual vehicle speed becomes lower than the gradual reduction upper limit value during the vehicle speed gradual reduction control process.

2. The control method according to claim 1, wherein the traveling modes, which have different vehicle speed upper limit values for the electric vehicle, also include a third traveling mode having a vehicle speed upper limit value greater than the first traveling mode and the second traveling mode.

3. A control method of an electric vehicle propelled by motive power generated by an electric motor when the electric motor is supplied with electric power from an electric energy storage device, comprising:

setting selectable traveling modes having different vehicle speed upper limit values for the electric vehicle, the traveling modes including a first traveling mode and a second traveling mode, the second traveling mode having a vehicle speed upper limit value smaller than the first traveling mode, wherein the second traveling mode is a traveling mode in which priority is given to a traveled distance per unit amount of electric power consumption, wherein, if a traveling mode with a greater vehicle speed upper limit value is switched to a traveling mode with a smaller vehicle speed upper limit value, and if an actual vehicle speed exceeds the vehicle speed upper limit value after switching of the traveling mode, a vehicle speed gradual reduction control process is performed to gradually reduce the vehicle speed to the vehicle speed upper limit value after switching of the traveling mode, wherein the traveling modes, which have different vehicle speed upper limit values for the electric vehicle, also include a third traveling mode having a vehicle speed upper limit value greater than the first traveling mode and the second traveling mode, wherein an absolute value of a vehicle speed gradual reduction gradient, which is representative of a reduced degree of the actual vehicle speed in the vehicle speed gradual reduction control process, is set to a greater value when the third traveling mode is switched to the second traveling mode than when the third traveling mode is switched to the first traveling mode.

4. The control method according to claim 3, wherein a gradual reduction upper limit value, which is representative of the vehicle speed upper limit value used in the vehicle speed gradual reduction control process, is set from the actual vehicle speed depending on the vehicle speed gradual reduction gradient; and the gradual reduction upper limit value is reduced depending on the actual vehicle speed, if the actual vehicle speed becomes lower than the gradual reduction upper limit value during the vehicle speed gradual reduction control process.

* * * * *